Aug. 26, 1969        R. McVAY              3,462,871
                     FISHING LURE
                   Filed Nov. 15, 1967
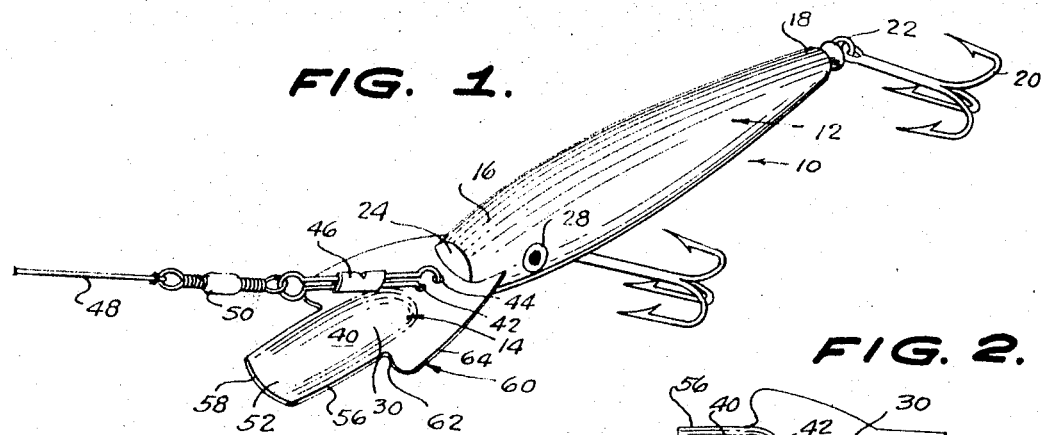
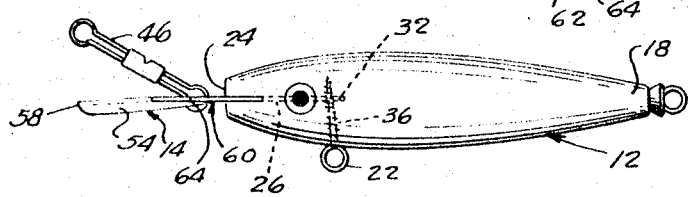
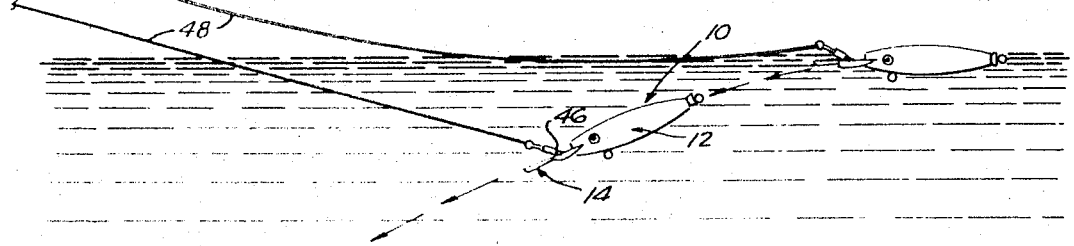
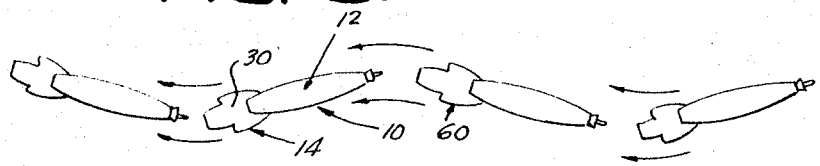
INVENTOR.
RAYMON McVAY,
BY
Robert G. McMorrow,
ATTORNEY.

United States Patent Office 3,462,871
Patented Aug. 26, 1969

3,462,871
FISHING LURE
Raymon McVay, 717 W. Morgan, Denison, Tex. 75020
Filed Nov. 15, 1967, Ser. No. 683,341
Int. Cl. A01k 85/00
U.S. Cl. 43—42.47                                                  1 Claim

ABSTRACT OF THE DISCLOSURE

A fishing lure having a forward diving plate with a concave forwardly extended portion producing a diving action upon retrieve. The extended portion has longitudinally extending side edges with tapered planar side wings along the rear portion of the edges, to resist the tendency of the lure to wobble and to produce a synchronous, sinusoidal path of travel. The extended portion is inclined relative to, and the side wings are in line with, the longitudinal axis of symmetry of the lure.

BACKGROUND OF THE INVENTION

Field of the invention

This invention relates to fishing lures of the types used for casting and trolling, in which the lure has an extended plate to control its movement in the water.

Description of the prior art

In the fishing lure art it has been conventional practice for many years to combine a normally buoyant lure body with a forwardly extending plate. In general, the reaction of these plates to the pulling of the lure through the water is that of imparting a diving action to the lure body whereby the otherwise buoyant body runs in submerged position upon retrieve. All such diving plates however, due essentially to water resistance, additionally impart a wobbling side to side motion which is objectionable in that it is not simulative of the movement of natural bait.

Examples of prior patents in this general field are listed as follows: 1,084,517, Wilson, issued Jan. 13, 1914; 1,133,669, Reynolds, issued Mar. 30, 1915; 1,927,441, Korte, issued Sept. 19, 1933; 1,981,091, Clark, issued Nov. 20, 1934; 2,036,946, Malecek, issued Apr. 7, 1936; 2,235,597, Winter, issued Mar. 18, 1941; 2,425,272, Walker, issued Aug. 5, 1947; 2,611,210, Clark, issued Sept. 23, 1952.

SUMMARY OF THE INVENTION

A basic objective of the present invention resides in the provision of a fishing lure which is normally buoyant, but is fitted with a diving plate causing the lure to be submerged when drawn through the water, such as on retrieve of the lure in a casting situation or in trolling; and at the same time, to maintain a life-like lure action which avoids excessive vibration or wobble of the lure. Related to this basic objective is the structural concept of a forward, dished diving plate on a lure having stabilization means to effectively prevent undesirable lure wobble.

Still another object concerns the provision of a diving plate for fishing lures, the diving plate being adaptable to many different types of lures.

In accomplishing the stated basic objective, the plate hereof achieves a balanced action while maintaining symmetry of appearance.

Other and further objects and advantages of the invention will become apparent to those skilled in the art from a consideration of the following specification, when read in conjunction with the annexed drawing.

BRIEF DESCRIPTION OF THE DRAWING

FIGURE 1 is a perspective view of a typical lure embodying the present invention;

FIGURE 2 is a bottom plan view of a diving plate of the invention;

FIGURE 3 is a side view of the lure of FIGURE 1 with its hooks and line removed;

FIGURE 4 is a first diagrammatic view illustrating the diving action of the lure as it is drawn through the water; and FIGURE 5 is a second illustration of the lure action as seen from above.

DESCRIPTION OF THE PREFERRED EMBODIMENT

In the drawing, reference numeral 10 generally identifies a typical lure hereof, shown by way of nonlimiting example. The lure comprises a buoyant lure body 12 and a forward diving plate 14. The body 12 of the lure 10 is generally formed of wood, plastic or hollow form, whereby it is normally buoyant, while the plate 14 is of rigid metal or plastic material.

The body 12 has opposite leading and trailing end sections 16, 18, and has hooks 20 connected at appropriate locations by eye assemblies 22. The leading end section 16, is truncated at 24, and has a forward opening slot 26 formed therein on its central axis of symmetry. If desired, suitable ornamentation, such as eyes 28, may be added so that the lure is more closely simulative of the appearance of natural bait.

The plate 14 comprises a plate body 30 having a flat, substantially rectangular mounting section 32. The section 32 is mounted frictionally in the slot 26, and has an opening 34 formed therein. A screw shaft 36 of one of the eye assemblies 22 extends through the leading end section 16 of the lure body and through the opening 34 thereby providing a first anchoring means fixedly securing the plate and lure to one another. A second opening means 38 is formed in the mounting section 32 and a locking pin or shaft (not shown) may optionally be extended therethrough to provide a second anchoring means.

Projecting forwardly of the lure body from the imbedded section 32 is an elongated portion 40 of the plate. The portion 40 is of substantial length relative to the greater length of the overall lure body, and has a pair of openings 42, 44 formed therein adjacent the lure body end 24. A conventional lure connection clamp 46 is connected through the openings 42, 44 and has a line 48 connected thereto. If desired, a swivel 50 may be interposed between the line 48 and clamp 46.

The portion 40 has a concave upper face 52 and a convex lower face 54. The longitudinal side edges 56 of the portion 40 terminate at a squared, transverse forward end 58. Stabilization means of this invention comprise a pair of wings 60. The wings 60 are of opposite but equivalent configuration, and each is of flat form and in planar alignment with the flat mounting section 32 of the plate, as best seen in FIGURE 3. The wings include a curved, inwardly dished leading edge 62 and a tapered side trailing edge 64 which merges into the mounting section.

With the lure assembled in the manner indicated in FIGURE 1, and drawn through the water in a cast and retrieve sequence or by trolling, the impingement of the water on the plate results in a diving motion so long as pressure is continued, as indicated in FIGURE 4. This would, in the absence of the side wings 60, cause a wobbling or erratic fluctuating side-to-side lure movement. However, the wings resist the tendency of the lure to wobble and result instead in a smooth, serpentine path of travel, as shown in FIGURE 5. This path of travel is a close simulation of the actual movement of natural bait and thus greatly improves and enhances the fish attracting qualities of the lure.

Having described and illustrated an embodiment of the invention in some detail, it will be understood that these descriptions and illustrations have been offered only by way of example.

I claim:

1. A fishing lure for casting or trolling adapted for submerged operation and characterized by a sinusoidal path of travel when submerged and by minimized water resistance, the lure comprising:

a lure body having leading and trailing sections and being of a given length from end to end;

hook means attached to the lure body at selected locations;

the lure body having a central longitudinal axis of symmetry;

a diving plate comprising a plate body of substantial length in respect to the length of the lure body with a flat mounting section fixedly engaged with the lure body in a location substantially in line with said axis of symmetry throughout its extent;

the flat section having a portion extending forwardly of the lure body and having means formed in said portion for connection with line attachment means;

the diving plate having an elongated portion projecting forwardly from the flat mounting section a substantial distance relative to the length of the diving plate and being inclined relative to the flat mounting section and said axis of symmetry;

the elongated portion being of concave-convex form in section and of substantially rectangular plan and having a squared forward end, and having longitudinally extending side edges; and wings extending from the rearward portion of each of the side edges, the wings being substantially flat and being in planar alignment with the flat mounting section and said axis of symmetry, and each wing having an indented, curvilinear leading edge and a tapered trailing edge, the lure as it is drawn through the water, being forced into a declining, diving attitude by the water resistance of the diving plate, creating a side-to-side action which is resisted by the stabilizing action of the wings.

References Cited

UNITED STATES PATENTS

| | | | |
|---|---|---|---|
| 1,832,172 | 11/1931 | Winter | 43—42.47 |
| 1,927,441 | 9/1933 | Korte | 43—42.47 |
| 1,981,091 | 11/1934 | Clark | 43—42.23 |
| 2,235,597 | 3/1941 | Winter | 43—42.47 X |
| 2,313,709 | 3/1943 | Dunkelberger | 43—42.47 X |
| 2,425,272 | 8/1947 | Walker et al. | 43—42.47 |
| 2,570,338 | 10/1951 | Gambill | 43—42.47 X |
| 2,598,012 | 5/1952 | Prieur | 43—42.47 |

FOREIGN PATENTS

| | | |
|---|---|---|
| 458,710 | 8/1949 | Canada. |

SAMUEL KOREN, Primary Examiner

J. H. CZERWONKY, Assistant Examiner